Feb. 17, 1953
A. KURNICK ET AL
2,628,545
FILM MAGAZINE
Original Filed May 20, 1948
4 Sheets-Sheet 1
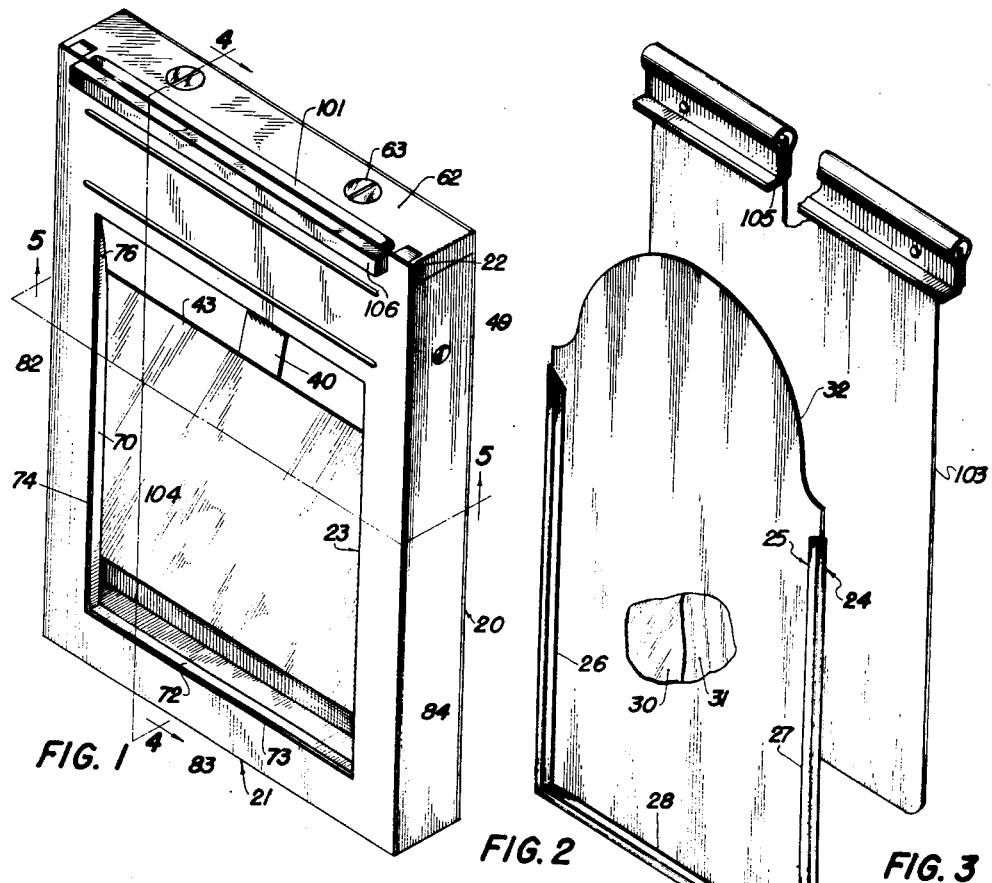
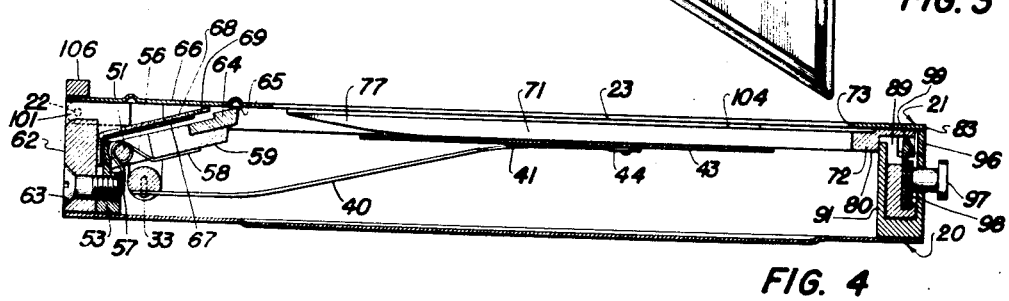
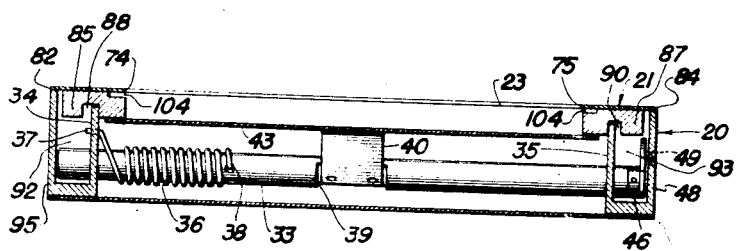
INVENTORS
ABRAHAM KURNICK
LOUIS BROWNSTEIN
BY
ATTORNEY

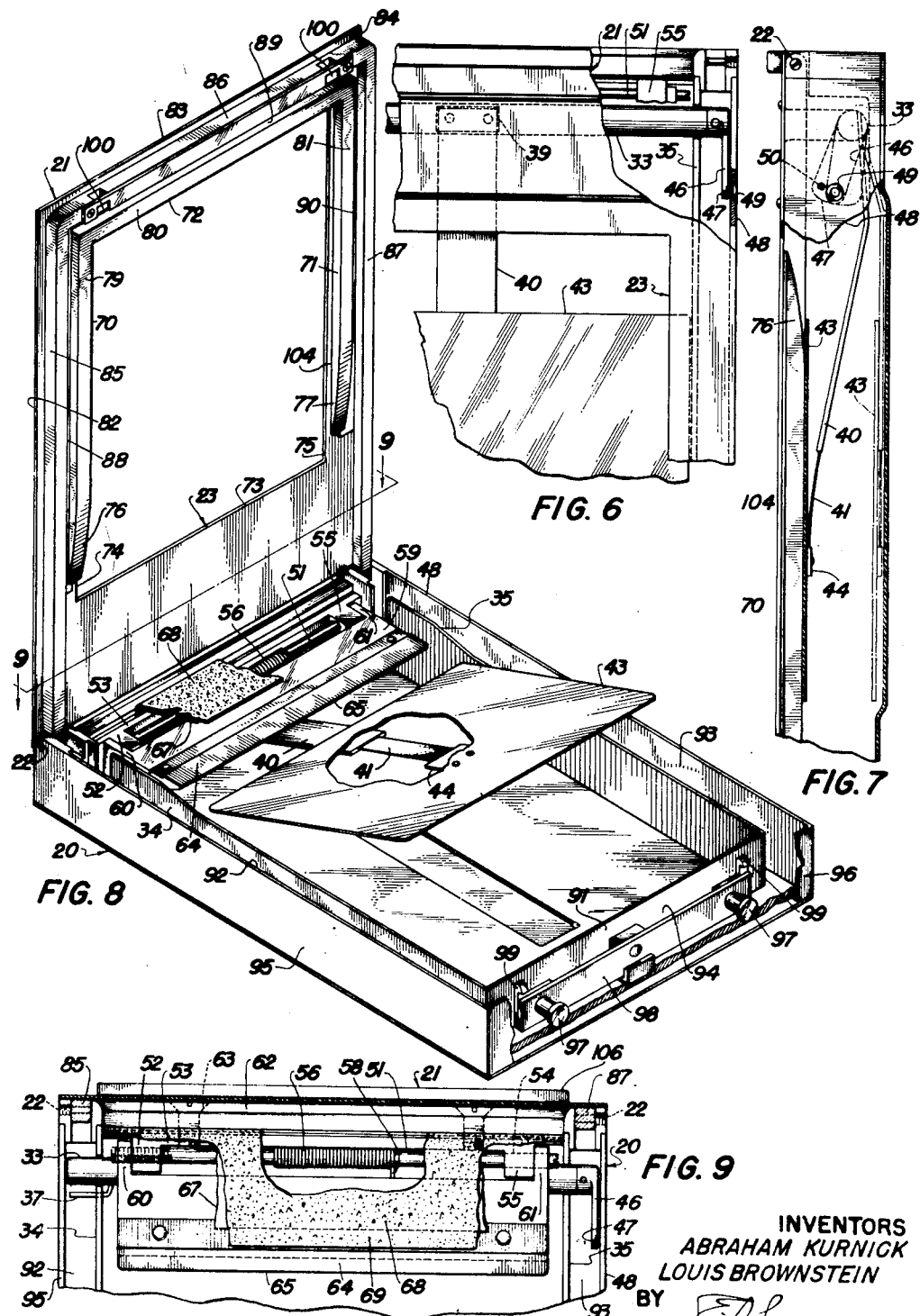

Feb. 17, 1953  A. KURNICK ET AL  2,628,545
FILM MAGAZINE
Original Filed May 20, 1948  4 Sheets-Sheet 3

INVENTORS
ABRAHAM KURNICK
LOUIS BROWNSTEIN
BY
ATTORNEY

Feb. 17, 1953  A. KURNICK ET AL  2,628,545
FILM MAGAZINE
Original Filed May 20, 1948  4 Sheets-Sheet 4
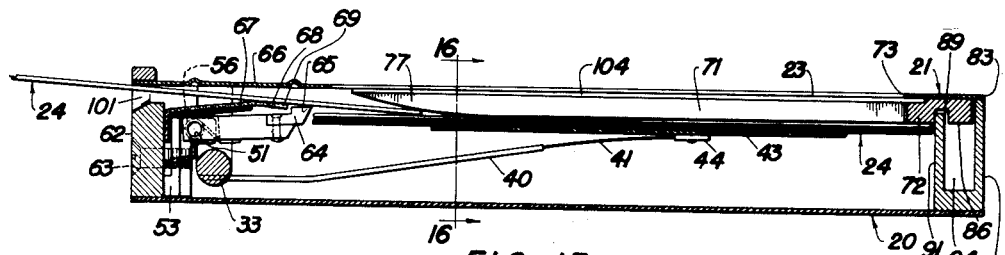
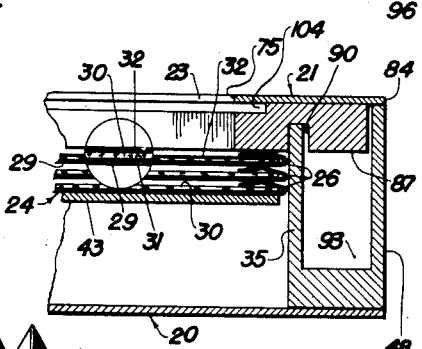
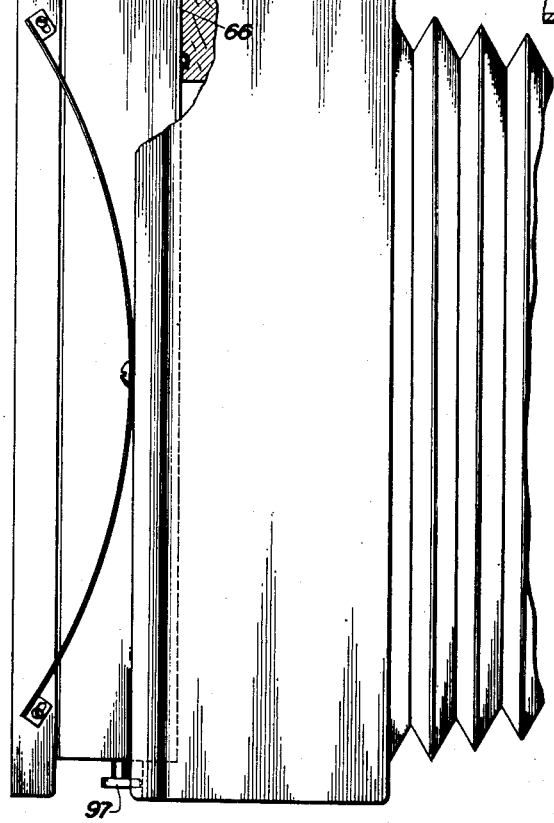
INVENTORS
ABRAHAM KURNICK
LOUIS BROWNSTEIN
BY
ATTORNEY Patented Feb. 17, 1953

2,628,545

UNITED STATES PATENT OFFICE 2,628,545

FILM MAGAZINE

Abraham Kurnick and Louis Brownstein, New York, N. Y., assignors to Finkurn Enterprises, Inc., New York, N. Y., a corporation of New York Application February 11, 1950, Serial No. 143,772

19 Claims. (Cl. 95—19)

This invention relates to film magazines of the type adapted for use with cut films, the invention being adapted for use with a plurality of film packets described in our application, Serial No. 143,771, this being a continuation-in-part of an application filed May 20, 1948, Serial No. 28,178, now abandoned.

Many commercial types of magazines are adapted to hold one, or at best two, film sheets, thereby frequently making it necessary for a photographer to carry with him a large bulk of such magazines. It is primarily within our contemplation to overcome this shortcoming by providing an efficient cut film holder which will be capable of receiving and holding a relatively large number of cut films.

In using the said conventional type of magazine, there is a further disadvantage that it must be loaded in a dark room, and that certain extraordinary precautions must be taken to make certain that the emulsion side of the film is correctly positioned, that the proper type of film has been selected by taking manual note of the position of indicating notches, and that a suitable light-guard slide be correctly disposed within the magazine in relation to the film. It is our objective to provide a magazine having none of the aforesaid disadvantages, one which will be capable of daylight loading and in which the said precautions need not be taken. And in this aspect of our invention it is an object to employ a special type of film packet of our invention, more particularly described in our said patent application, Serial No. 143,771.

Attempts have heretofore been made to eliminate the disadvantages of the conventional cut film magazine, the most commonly known expedient being the employment of a film pack. In this construction the holder is provided with a roller around which the film is pulled. This makes it necessary that a thin film be employed, that is, one with a thin base. Such films are unsatisfactory, particularly because they cannot be retouched on account of their very thinness. They are also difficult to handle because of their curling tendencies; they easily buckle and become mutilated, and become abraded particularly because of the sharp U-turn which the film must make in passing over the roller. In another attempt to overcome the shortcomings of the said conventional cut film magazine, the expedient was resorted to of employing a flat film in an envelope of paper which is sealed in relation to the envelope and is removable by pulling a string to break the seal in order to permit exposure of the film. This last-mentioned expedient not only has the obvious disadvantage of preliminarily attaching a string to the film package, as well as the inconvenience of pulling the string for effecting a tear of the seal with each exposure, but it also has the further disadvantage of making it necessary to employ a film holder containing a lever that must be shifted prior to each exposure in order to make room for successive films. It is accordingly among our objectives to provide a cut film magazine employing no roller, string pulling arrangement, or lever actuating mechanism, but which will be simple in construction and adapted for cooperative use with films of relatively heavy gauge, with non-curling tendencies and readily adapted for retouching.

In the holder made according to the aforesaid application, Serial No. 28,178, two inlet apertures are provided, one for the film packet, and the other for a magazine safety slide or shield, thereby requiring two separate light traps. It is within our contemplation to provide a magazine wherein only a single inlet aperture is employed, thereby requiring only a single light trap.

And in the same prior patent application a fixed stripper is employed for arresting the movement of the film packet within the magazine while the paper slide is being withdrawn. Said stripper is fixed in position and is therefore apt at times to permit a relatively thin packet to slide upwardly through the aperture when the paper slide is being withdrawn. It is an important object of our invention to provide an articulated spring-urged stripper, which will at all times be in yieldable pressing engagement with the film packet, so that there will be positive engagement to arrest the movement of the packet while removing the slide regardless of the thickness of the packet.

Still another shortcoming of the structure of said prior application is the use of an ineffectively anchored spring for holding the film pressure pad against the rearmost film packet, thereby presenting the danger of the film or films in the magazine not being disposed in or parallel to the focal plane of the shutter. It is within the contemplation of this invention to improve upon this construction by providing a pressure pad or follower that will at all times be properly spring-urged forwardly, and to further provide coacting positioning means so that they will be normal to the focal axis, and whereby the foremost film will be in the focal plane of the camera to which the magazine is attached.

And in connection with the last-mentioned aspect of our invention, it is an important object to provide spring means which will act upon the film pressure pad with a minimum of spring pressure variation between the empty and fully-loaded condition of the magazine. In the accomplishment of this objective we have succeeded in avoiding the appreciable building up of pressure or spring tension as the film pressure pad is being pressed back rearwardly as the magazine is being filled. Having a substantially equal pressure throughout the entire operative movement of the pressure pad, there is no danger of a bending or buckling of the films under half or full load conditions of the magazine.

It is also an object of our invention to provide a film pressure pad so mounted that it will readily accommodate itself for positioning in different planes, depending upon the direction of movement of the film packet as it is being inserted. Our object is to enable the pressure pad to be in full contact with the rear of the film packet as it is being inserted, regardless of its angular disposition, and thereby prevent a buckling or bending thereof with possible injury to the film as well as the possible infiltration of light through buckled marginal edges.

It is also an important object of our invention to provide an entrance path for film packets which will enable the packet, when it is being operatively pushed inwardly, to avoid abutting engagement with the top edge of the pad or that of a previously inserted film packet, and which will enable the packet to find a predetermined focal plane position. And in this aspect of our invention it is a further object to provide means adapted to receive and guide, as well as maintain the packet along its intended path and in said predetermined position.

Still a further object of our invention is to provide a light trap which is spring-urged against the front cover and the film packet as it is being inserted, whereby the trap will be effective at all times. And in this aspect of our invention it is a further object to provide a plush or velvet type of light trap material so positioned that it can be readily reached for cleaning purposes.

It is also an object of our invention to provide indicating means adapted to visibly indicate when the magazine is entirely filled with film packets.

Still a further object of our invention is to facilitate the removal from the magazine of exposed film packets, an object which is accomplished through spring means for urging the packets into a convenient removing position when the magazine cover is opened.

Other objects, features and advantages will appear from the drawings and the description hereinafter given.

Referring to the drawings,

Figure 1 is a perspective view of the film magazine of our invention, shown in its closed position, without film packets or the magazine safety slide therein.

Figure 2 is a perspective view of the film packet adapted for use with said magazine, fragments being broken away for clarity.

Figure 3 is a perspective view, with a fragment broken away for clarity, of the magazine safety slide for use with this invention.

Figure 4 is a longitudinal transverse section of Figure 1 taken substantially along line 4—4 thereof.

Figure 5 is a horizontal transverse section of Figure 1 taken substantially along line 5—5.

Figure 6 is a fragmentary front view, partly in section and parts broken away for clarity, of the upper right hand corner of the magazine of Figure 1.

Figure 7 is a fragmentary side view thereof, partly in section for clarity, the dot-dash lines showing the rearmost position of the film pressure pad such as when the magazine is fully loaded.

Figure 8 is a perspective view of the magazine with the cover open and with the film pressure pad in its raised film removing position, fragments being broken away for clarity.

Figure 9 is a section of Figure 8 taken substantially along line 9—9.

Figure 15 is a fragmentary section like Figure 11, but showing the position of the film packet in engagement with the entrance curve of the guiding cam.

Figure 10:
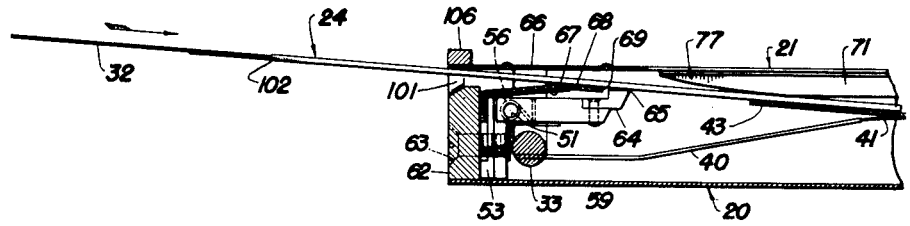
Figure 10 is a fragmentary view, substantially like Figure 4, showing a position of the film packet while it is being inserted in the magazine.
Figure 11:
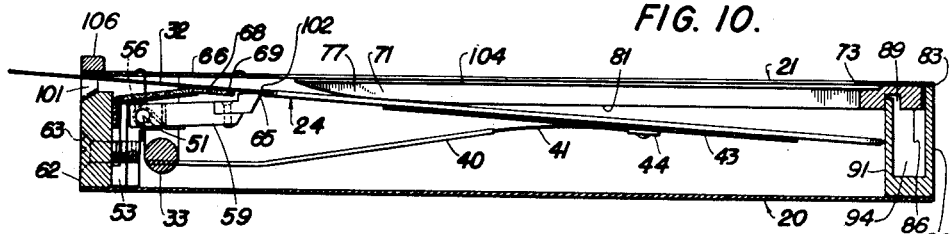
Figure 11 is a view like Figure 10, showing the film packet entirely inserted and before the paper packet slide is removed.

Figure 16 is a fragmentary section of Figure 15 taken substantially along line 16—16, showing a number of film packets operatively in place within the magazine, the foremost packet still having therein the paper packet slide, a portion being magnified for clarity, and Figure 17 is a side elevation of a camera to which is attached our film holder, a fragment being removed for clarity, the magazine safety slide being shown in the process of being removed.

In the preferred form of our invention illustrated, the magazine comprises a main casing 20 and a cover member 21 hingedly attached at 22 to the casing. The front of the cover is provided with an exposure window 23 proportioned to expose the film in film packet 24. The details of the film packet will not herein be set forth, since it is adequately described in our said co-pending patent application Serial No. 143,771. Suffice it to say, for the purpose of the present specification, that it comprises (see Figures 2 and 16), an outer metal foil envelope 25 with inturned edges forming lateral and bottom edge portions 26, 27 and 28, respectively, said portions cooperating with the back wall 29 of the envelope to retain therein a cut film 30, an inner envelope 31 and a paper packet slide 32. The manner in which this packet is operatively employed in the magazine of our invention will appear from the description hereinafter given.

The casing 20 contains at the upper portion thereof a transverse indicator shaft 33, said shaft being operatively and rotatably mounted within suitable apertures in the inner walls 34 and 35. Mounted over said shaft is the helical spring 36 one terminal 37 of which is anchored to wall 34, the other terminal 38 being secured to the shaft. Attached to the central portion 39 of said shaft is the pad-supporting arm 40, the lower portion 41 of the arm being of reduced width (Figure 8) and being secured at the lowermost terminal thereof to the film pressure pad 43. In the preferred structure, an anchoring strip 44 overlies the said terminal portion and is secured to the pad by fasteners. The said lower portion 41 is flexible, because of its reduced width and its thinness, so as to provide a swingable mounting for the pad 43.

The right terminal portion of indicator shaft 33 (Figures 5, 6 and 7) has attached thereto indicator arm 46 the terminal portion 47 of which carries the colored spot 50. The outer wall 48 of the casing contains a small indicator window 49 adapted for registry with the said colored marking 50 in one position. More specifically, the parts are so arranged that said marking 50 of the terminal portion 47 is in registry with window 49 when the shaft 33 is in the position at which it supports film pad 43 in its rearmost position, as indicated by the dot-dash lines in Figure 7. It will be seen that in this position, the said arm 46 is in its rearmost position, also as indicated by dot-dash lines in Figure 7, to expose to view through window 49 the colored portion 50 of terminal 47. As will hereinafter appear, it is in this position when the magazine is fully loaded, a condition which is visibly evident through window 49.

Disposed forwardly of indicator shaft 33 is the stripper shaft 51 which is threaded into the lug 52 of the stripper support 53, the opposite terminal portion 54 of shaft 51 extending through lug 55. Mounted over shaft 51 is the spring 56, one terminal of said spring 57 (Figure 4) being in abutting engagement with member 53, the other terminal 58 being in underlying engagement with the stripper member 59 whose opposite ears 60 and 61 are mounted over the opposite extremities of stripper shaft 51, and rotatable thereabout. The action of spring 56 is therefore such as normally to urge the stripper member 59 forwardly. It will be noted that the stripper support 53 is secured to the top wall 62 by fasteners 63.

Figure 12:
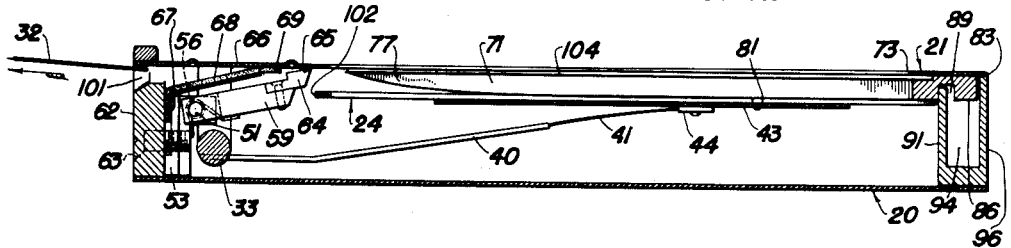
Figure 12 is a view like Figure 11, but showing the film packet in its operative position in the focal plane, after the paper packet slide has been stripped, said slide being shown exteriorly of the magazine.

The forward portion 64 of the stripper member 59 contains a sharp arresting edge 65, this being in yieldable engagement with the top wall 66 of the said cover 21 when it is in its closed position, as clearly indicated in Figures 4 and 12.

Disposed over the stripper support 53 is the light trap base 67 over which is disposed the plush light trap 68. The backing 67 is a sheet of spring material, and the light trap material 68 is preferably a sheet of opaque plush or velvet, the lower edge 69 of which extends below the bottom edge of the backing 67, as clearly shown in Figures 8 to 13.

On the rear wall of cover member 21 are the walls 70, 71 and 72 bordering three of the edges of exposure opening 23. Considering the device with the cover in its closed condition, said wall 72 borders the bottom edge 73 of said opening (Figure 4) and the said walls 70 and 71 border the lateral edges 74 and 75 of said opening (Figure 8). The upper terminal portions 76 and 77 of said walls 70 and 71 (again considering the device in its closed operative condition) are curved towards the wall 66 of the cover 21, the terminals of said curved portions 76 and 77 being spaced from the top of the cover. As will hereinafter appear, the curved surfaces of portions 76 and 77 serve as cams for guiding the film packet into the interior of the casing, said surfaces merging with the respective surfaces 79 and 81 of walls 70 and 71, said surfaces 79 and 81 together with surface 80 of wall 72 being in one plane, the predetermined focal plane. As will hereinafter appear, said surfaces 79, 80 and 81 serve as film packet rests for proper positioning of a film for exposure.

Along the three outer peripheral edges 82, 83 and 84 of the cover are the ridges 85, 86 and 87 whereby three recesses 88, 89 and 90 are formed between said ridges and said walls 70, 72 and 71, respectively. These recesses are positioned to receive therein the inner walls 34, 35 and 91 of the casing, when the cover 21 is in closed position. In this position, the said ridges 85, 87 and 86 accordingly enter the spaces 92, 93 and 94 formed by said inner walls 34, 35 and 91 and the outer walls 95, 48 and 96 of the casing, thereby providing a light-tight arrangement.

The cover member 21 is in releasable locking engagement with the casing 20, the particular locking mechanism shown comprising two finger manipulable buttons 97 extending through wall 96 and mounted on the spring member 98. The latter contains the latches 99 which slidably enter the recessed portions 100 when the cover is pressed against the casing, in well-known manner. To effect an opening of the cover, the said buttons 97 are pressed inwardly, thereby disengaging the latches 99 and permitting the cover to be opened.

When the cover is in its closed position, the device is ready to receive film packets. By referring to Figures 10 to 15 it will be seen that when the cover is closed the upper portions of the cover 21 and casing 20 are spaced to provide an aperture 101 through which the film packet 24 is inserted. By referring first to Figure 15 it will be seen that the film packet 24 enters at a slight angle with respect to the plane of the cover, and engages the cam surfaces 76 and 77 of the walls 70 and 71, Figure 15 showing merely the engagement with cam surface 77. In this position, the arresting edge 65 of the stripper member is in slidable pressing engagement with the body portion of the film packet, the lower overlapping edge portion 69 of the light-trap material 68 also slidably engaging the packet. Now, by referring to Figure 10 it will be seen that upon a further inward movement of the packet, the lowermost portion thereof continues to ride along the cam surfaces, the packet being disposed between the walls 70 and 71 (only 71 being shown) and the pressure pad 43. Since the pad is supported by the thin portion 41 of the arm 40, the pad will adjust itself to the angular position of the film packet, as clearly shown in Figures 10 and 11. In the position of the packet shown in Figure 11, it has reached its lowermost position against the bottom inner wall 91, the arresting edge 65 of the stripper being in engagement with the topmost edge 102 of the film packet body portion, the paper slide 32 extending thereabove. The packet is maintained in this inclined position primarily due to the yieldable pressure exerted by the stripper against the packet, the spring pressure which urges the arm 40 forwardly being sufficiently light, and the narrow portion 41 of said arm being sufficiently thin and resilient, to permit such action. It should be noted that the tab 32 is of sufficiently stiff material to permit it to receive and transmit to the packet a force for the operative insertion of the packet into the magazine.

When the packet slide 32 is operatively withdrawn from the magazine, as indicated in Figure 12, the body portion of the packet remains within the magazine, since the arresting edge 65 of the stripper 59 held said body portion against retraction while the slide 32 was pulled outwardly. After this operation, the spring-urged pad 43, which is preferably attached to the arm 41 at a point below the center of the pad, forces the film packet 24 against the flat rests 79, 80 and 81 (only 81 being shown in the figure) since the stripper 59 is no longer in engagement with the film packet. The result is that the film packet is in the predetermined focal plane of the device, so that when the magazine is operatively attached to a camera, as indicated in Figure 17, the film that had been exposed by the removal of the packet slide 32 is in proper exposed position.

This process is continued, new film packets being inserted in the manner above-indicated, and in each case the packet slide 32 is removed to expose the foremost film. As each packet is inserted, it engages the foremost packet already within the magazine, as indicated in Figure 15. The added insertion of packets causes the film pad to yieldably move rearwardly, until the entire magazine is filled. This is indicated, as aforesaid, by the exposure of colored marking 50 through the window 49.

Figure 13:
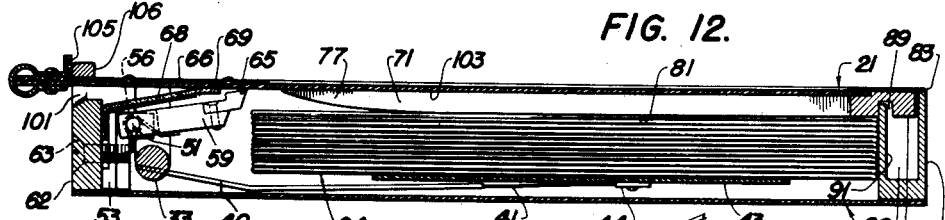
Figure 13 is another view like Figure 12, but showing a plurality of film packets operatively in place, and also showing the magazine safety slide in place.

When it is desired to remove the magazine from the camera for any purpose whatsoever, the magazine safety slide 103 is employed. This is inserted through aperture 101, as indicated in Figure 13. This slide enters the recessed portions 104 formed between the cover 21 and the walls 70, 71 and 72; and when said slide is in its operative position, it prevents the infiltration of light through the front opening of the cover. The felt light-trap 105, which engages the upper lip 106 of the cover, supplements the action of the inner light-trap above-described.

Figure 14:
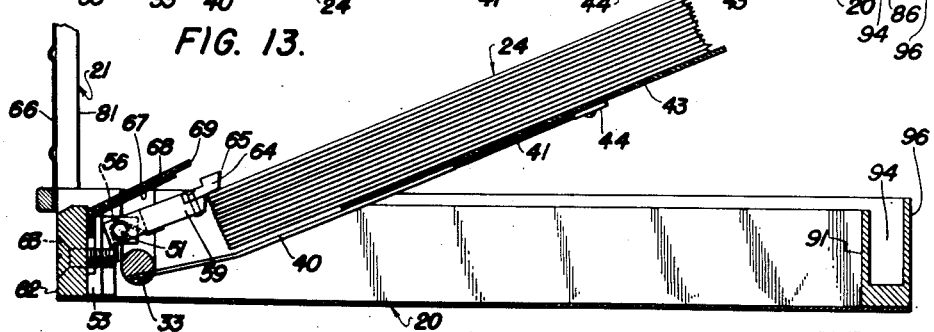
Figure 14 is a view substantially like Figure 13, but with the cover open and the film pressure pad in the position shown in Figure 8, with the film packets in position to be removed.

The magazine so protected can now be taken into a dark room for the removal of the exposed film packets. The removal is simply effected by opening the lid, whereby the spring-urged pad 43 will move to its upper exterior position beyond the opening of the casing, as shown in Figure 14, thereby enabling the film packets to be readily removed without the necessity of prying them out of the casing proper.

Throughout the entire operation of filling the magazine, the film pad 43 is progressively moved rearwardly, as aforesaid. Due to the relatively long arm 40 and the remote position of the anchorage of the arm at 45 with respect to the position of spring 36, there is a minimum of variation in spring pressure. In other words, the angular displacement of the convolutions of spring 33 is very small compared to the total angular movement of the pad, so that the total stress differential between the two extreme positions is very slight. It is for this reason that there is no undesirable building up of film pad pressures to cause a distortion or bending of the film packet.

It is also apparent that access can readily be had to the interior of the unit, for cleaning or other purposes. It is particularly important that the light-trap material 68 be accessible to remove accumulated dust and lint.

By referring to Figure 16 it will be seen that when a number of film packets are operatively disposed within the magazine, the films are in spaced relation due to the fact that only the lateral edge portions 26 (and 27 and 28) are in engagement. It is also to be noted that when the paper packet slides 32 are removed, the action of the spring-urged pad will press together the inturned portions of said marginal edge portions 26, 27 and 28, to completely close any gap that may be left open upon withdrawal of the paper slide.

It will be further observed that the film-pad arm 40 is rearwardly disposed of the stripper member 59, and out of engagement therewith throughout its entire operative movement within the casing. There is thus no interference whatsoever between the said arm and stripper device during their operative movements.

In the above description, the invention has been disclosed merely by way of example and in preferred manner; but obviously many variations and modifications may be made therein. It is to be understood, therefore, that the invention is not limited to any specific form or manner of practicing same, except in so far as such limitations are specified in the appended claims.

We claim:

1. In a film magazine of the class described for use with a film packet having a body portion containing an outer envelope with marginal edge portions presenting a front exposure opening, a cut film and in front thereof a light-proof packet slide overlapped by said marginal edge portions, the slide having an extension beyond the body portion, the combination of a casing with an open front, a cover over the front of the casing and having a front exposure window positioned for registry with said exposure opening of the packet when operatively disposed within the magazine, a film pressure pad within the casing and spring-urged toward the front thereof, adjacent portions of the casing and cover being spaced to provide an entrance aperture for said packet, packet guiding means spaced from said entrance aperture and disposed along a path forwardly of said pad, whereby upon an operative insertion of the packet through said aperture it will slidably engage said guiding means for positioning forwardly of the pad, a stripper member movably mounted within the casing adjacent said entrance aperture and having an arresting edge, said stripper member being yieldably urged toward the front of the casing for slidable engagement with the packet as it is being operatively inserted through the said entrance aperture, said arresting edge being positioned between the entrance aperture and the nearest edge of the body portion of the packet when completely inserted within the casing, whereby said arresting edge will be operatively engageable with said nearest edge to hold the body portion of the packet against withdrawal upon an operative withdrawal of the packet slide through said aperture.

2. In a film magazine of the class described, the combination according to claim 1, the said cover being hingedly attached to the upper portion of the casing, the said spaced adjacent portions of the casing and cover being at the tops thereof to provide an upper packet entrance aperture, the stripper member being disposed below said entrance aperture, the said arresting edge being downwardly disposed and positioned above the said body portion of the packet when completely inserted within the casing, for operative arresting engagement with the upper edge of the said packet body portion.

3. In a film magazine of the class described, the combination according to claim 1, said stripper member being rotatably mounted within the casing.

4. In a film magazine of the class described, the combination according to claim 1, said stripper member being rotatably mounted within the casing, the mounting for the stripper member comprising a transversely disposed shaft, further provided with spring means mounted on said shaft and in engagement with the stripper member for urging it forwardly.

5. In a film magazine of the class described, the combination according to claim 1, further provided with a light-trapping member having a sheet of opaque flexible material between said arresting edge and said entrance aperture and yieldably urged into engagement with the said cover.

6. In a film magazine of the class described, the combination according to claim 1, further provided with a light-trapping member having a sheet of opaque flexible material between said arresting edge and said entrance aperture, and a resilient backing for said opaque material yieldably urging said sheet into engagement with said cover.

7. In a film magazine of the class described, the combination according to claim 1, further provided with a light-trapping member having a sheet of opaque flexible material between said arresting edge and said entrance aperture and yieldably urged into engagement with the said cover, said sheet overlying a portion of said stripper member.

8. In a film magazine of the class described, the combination according to claim 1, said stripper member being rotatably mounted within the casing, the mounting for the stripper member comprising a transversely disposed shaft, further provided with a support for said shaft, said support being secured to a wall of the casing, a light trapping member having a sheet of opaque flexible material and a resilient backing therefor yieldably urging a portion of the said sheet into engagement with the said cover, said sheet and backing being mounted on said support for the said shaft.

9. In a film magazine of the class described, the combination according to claim 1, further provided with an arm supporting said pad, and a mounting for said arm disposed rearwardly of the stripper member, the arm extending from its said mounting behind the said member.

10. In a film magazine of the class described, the combination according to claim 1, further provided with an arm supporting said pad, and a mounting for said arm disposed rearwardly of the stripper member, the arm extending from its said mounting behind the said member, said arm being out of engagement with the stripper member when the arm is disposed within the casing.

11. In a film magazine of the class described, the combination according to claim 1, said packet guiding means having a portion sloping forwardly towards said entrance aperture, for directing a packet operatively inserted through the aperture in an inclined direction rearwardly away from the aperture, the said arresting edge of the stripper member being in yieldable pressing engagement with the said slide extension of the packet when the packet is completely inserted within the casing, whereby the packet is maintained in an inclined position until the packet slide is operatively removed, the said pressure pad being swingably mounted for adjustment to the inclination of the inserted packet; and a film rest in a predetermined focal plane, said spring-urged pad being adapted to urge a film packet operatively positioned forwardly thereof towards and into engagement with said film rest upon the operative withdrawal of the packet slide.

12. In a film magazine of the class described, a casing, an exposure window at the front of the casing, a film entrance aperture along an end wall of the casing, a flat film pressure pad within the casing and spring-urged toward the front thereof, film guiding means within the casing and spaced from and sloping forwardly towards said entrance aperture and disposed forwardly of said pad, for directing a film operatively inserted through the aperture in an inclined direction rearwardly away from the aperture, the said pressure pad being swingably mounted for movement to a rearwardly inclined position in abutment with said rearwardly inclined inserted film, and film rest means in a predetermined focal plane, said spring-urged pad being adapted to urge a film operatively disposed forwardly thereof towards and into engagement with said film rest means.

13. In a film magazine of the class described, the combination according to claim 12, the said film guiding means smoothly merging into said film rest means so as to form a smooth continuous surface, whereby the inserted film will be continuously engaged during its operative movement from said inclined direction to its focal plane position against said rest means.

14. In a film magazine of the class described, a casing with an open front, a cover over the front of the casing and having therein an exposure window, a film entrance aperture along an end wall of the casing, a flat film pressure pad within the casing and spring-urged toward the front thereof, two walls on the inner surface of the cover and flanking the longitudinal edges of the said window, each wall comprising a guiding portion and merging therewith a film rest portion, said guiding portions being spaced from and sloping forwardly towards said entrance aperture, for directing a film operatively inserted through the aperture in an inclined direction rearwardly away from the aperture, the film rest portions being disposed in a predetermined focal plane, the said pressure pad being swingably mounted for movement to a rearwardly inclined position in abutment with said rearwardly inclined inserted film, said spring-urged pad being adapted to urge a film operatively disposed forwardly thereof towards and into engagement with said film rest portions.

15. In a film magazine of the class described, a casing, an exposure window at the front of the casing, a film entrance aperture along an end wall of the casing, a film pressure pad within the casing and spring-urged toward the front thereof, an arm carrying said pressure pad, a rotatably mounted shaft adjacent an end wall of the casing, said arm being mounted on the shaft, said pad and the said arm and shaft operatively associated therewith being movable between front and rear limiting positions, an indicator attached to one end of the shaft, and an indicator opening in a wall of the casing adjacent said indicator, said indicator being in registry with said opening when the pad is in said rear limiting position.

16. In a film magazine for film packets, a casing provided with an exposure window in the front thereof and a film entrance aperture along an end thereof, packet guide means within said casing and defining a predetermined focal plane for a film packet, a film pressure pad within said casing and adapted to abut against and engage said film packet, the ends of said packet guide means and of said film pressure pad adjacent said film entrance aperture being spaced apart to form an entrance guideway for the passage therethrough of said film packet, and flexible means operatively connected to said film pressure pad and mounting said film pressure pad for automatic adjustment to the position of a film packet during insertion into said casing and subsequent movement into said predetermined focal plane, said flexible means including an arm pivotally mounted adjacent one end thereof and having the other end secured to said film pressure pad.

17. A film magazine according to claim 16, wherein the dimensions of said arm adjacent said other end thereof are selected to form a neck having a reduced cross sectional area to thereby provide a substantially universal mount for said film pressure pad.

18. A film magazine according to claim 16, wherein said other end of said arm is secured to said film pressure pad at a location spaced beyond the center thereof and toward the end of said casing remote from said entrance guideway.

19. In a film magazine for film packets, a casing provided with an exposure window in the front thereof and a film entrance aperture along an end thereof, packet guide means within said casing and defining a predetermined focal plane for a film packet, a film pressure pad within said casing and adapted to abut against and engage said film packet, the ends of said packet guide means and of said film pressure pad adjacent said film entrance aperture being spaced apart to form an entrance guideway for the passage therethrough of said film packet, and flexible means operatively connected to said film pressure pad and mounting said film pressure pad for automatic adjustment to the position of a film packet during insertion into said casing and subsequent movement into said predetermined focal plane, said flexible means including an elongated arm having one end fixed to a median portion of said film pressure pad and mounting said pad for movement relative to said packet guide means, and means including a spring yieldably and swingably mounting said arm adjacent the other end thereof.

ABRAHAM KURNICK.
LOUIS BROWNSTEIN.

REFERENCES CITED

The following references are of record in the file of this patent:

UNITED STATES PATENTS

| Number | Name | Date |
|---|---|---|
| 622,696 | Pratt | Nov. 27, 1900 |
| 822,501 | Becker | June 5, 1906 |
| 840,540 | Whitney | Jan. 8, 1907 |
| 2,247,257 | Shelton | June 24, 1941 |
| 2,521,743 | Perlin | Sept. 12, 1950 |

FOREIGN PATENTS

| Number | Country | Date |
|---|---|---|
| 57,532 | Germany | July 8, 1891 |